W. E. GEYER.
STEERING GEAR.
APPLICATION FILED MAR. 15, 1909.
950,818.
Patented Mar. 1, 1910.
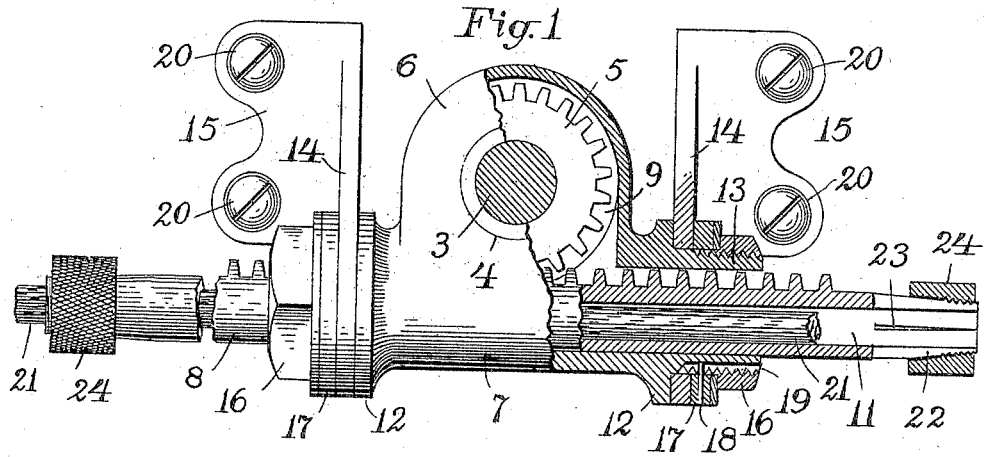
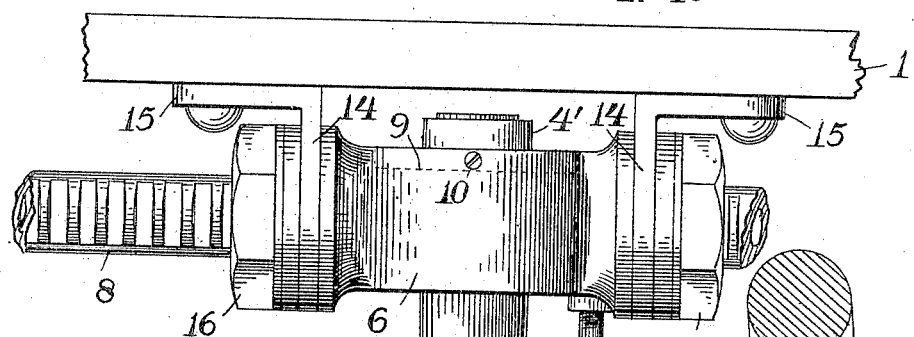
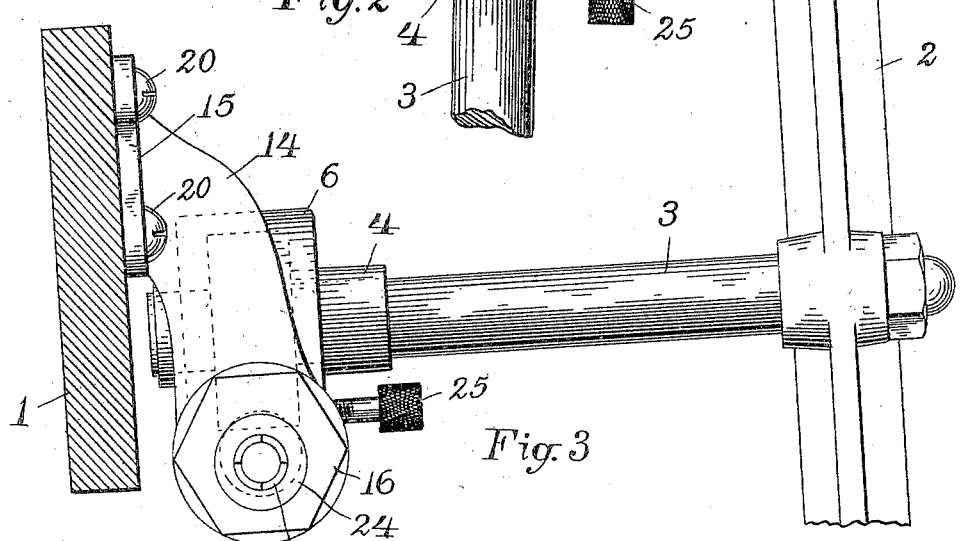
Witnesses:
Inventor,
William E. Geyer,
By A. B. Upham,
Attorney.

UNITED STATES PATENT OFFICE.

WILLIAM E. GEYER, OF CAMBRIDGE, MASSACHUSETTS.

STEERING-GEAR.

950,818.  Specification of Letters Patent.  Patented Mar. 1, 1910.

Application filed March 15, 1909. Serial No. 483,574.

*To all whom it may concern:*

Be it known that I, WILLIAM E. GEYER, a citizen of the United States, and a resident of Cambridge, in the county of Middlesex and Commonwealth of Massachusetts, have invented certain new and useful Improvements in Steering-Gears, of which the following is a full, clear, and exact description.

This invention relates to steering gears for power-boats, yachts and other small craft, and it has for its object the effecting of certain improvements in details of construction hereinafter set forth.

Referring to the drawings forming part of this specification, Figure 1 is a front elevation, with parts broken away, of a steering gear embodying my improvements. Fig. 2 is a plan view of the same. Fig. 3 is a side view of the invention.

The reference numeral 1 in Figs. 2 and 3 designates the board fixed transversely in the boat for which the steering apparatus is designed, and to which the latter is fastened. The steering wheel 2 is rigidly mounted on the shaft 3 whose inner end is rotatable in bearings 4, and upon said end between said bearings is fastened the pinion 5.

The front bearing 4 and the case 6 inclosing said pinion are preferably made integral with the elongated bearing 7 within which slides the tubular rack 8 meshing with said pinion, as shown in Fig. 1. The rear bearing 4' is formed as a part of a disk 9 affixed to said case in any suitable way, as by means of one or more screws 10, as indicated in Fig. 2.

The rack 8 is cylindrical, with its teeth cut in its upper surface; the opening 11 longitudinally through the rack being eccentric therewith to provide ample metal for said teeth.

Near each end of the elongated bearing 7 is a shoulder 12 beyond which is a threaded terminal 13, and about these terminals are the suitably apertured wings 14 of the supporting plates 15. These wings are made rigid with said bearings, or at least rigid enough to sustain the steering wheel 2 in its normal position, by means of the nuts 16 on said threaded terminals, a movement of said bearing caused by raising or lowering the steering wheel, being prevented from unloosening said nuts by means of the washers 17 having each a pin or lug 18 entering a longitudinal groove 19 in the threaded terminals.

As shown in Figs. 1 and 3, the wings 14 are elongated sufficiently to bring the bearing 7 entirely below the level of the screws 20 by means of which the plates 15 are secured to the board 1. This serves two important functions, the first of which is the free access thereby given to said screws for driving them into said board in mounting the steering gear in place; and the second is the means which it provides for varying the level of the said gear. By locating the shaft 3 below said plates, the latter is rendered much lower than when the device is turned over and said shaft brought above the plates.

The tiller rope 21, which is usually a quarter-inch wire rope, is preferably run through the opening 11 of the tubular rack 8, and is made fast therein so that the longitudinal movements given to said rack by the rotation of the wheel 2 and pinion 5 will correspondingly move said rope and thereby turn the rudder. I prefer to thus fasten the tiller rope by splitting the ends of the tubular rack, tapering and threading the same, and screwing a nut upon each. By screwing up said nuts, said split ends are clamped tightly upon said rope and the latter made fast therein. The reference numerals 23, 23 and 24 designate respectively said tapered threaded ends, slits and nuts.

To permit of the tiller's being locked temporarily in any desired position, as for holding the craft straight ahead, I provide the set screw 25 tapped through the side of the elongated bearing 7 into engagement with the teeth of the rack 8, as indicated in Figs. 2 and 3.

Previous to this invention, it has been the custom in the use of a rack and pinion for controlling the rudder, to tie the ends of the tiller rope to the ends of the rack. To do this so that the pinion is at the mid-length of the rack when the rudder is adjusted for straight ahead, is exceedingly difficult. With my present steering gear, all that is necessary to do is to reeve the tiller rope through the tubular rack and tie its ends to the tiller. Then, having rotated the pinion until it is at the mid-length of the rack, the nuts 24 are turned until the split ends have suitably clamped the rope fast therein, and the act is accomplished.

What I claim as my invention and for which I desire Letters Patent is as follows, to wit:—

1. A steering gear comprising an elongated channeled member, means for longitudinally moving the same, a tiller rope located in said channel, and means for fastening said rope in said channel.

2. A steering gear comprising a rack having a longitudinal channel therein, a pinion engaging said rack, a steering wheel connected with said pinion, a tiller rope located in said channel and means for fastening said rope in said channel.

3. A steering gear comprising a tubular rack, a pinion meshing therewith, means for rotating said pinion, a tiller rope in said tubular rack, and means for fastening said rope within said rack.

4. A steering gear comprising a tubular member having an end split, tapered and threaded, a nut on the latter, a rope within said tube held in place by said split end and nut, and means for longitudinally moving said tube.

5. A steering gear comprising a rack, a pinion meshing therewith, means for rotating said pinion, a tiller rope connected with said rack, bearings for said rack and pinion, and means directly engaging said rack to lock it from movement.

6. A steering gear comprising an elongated member, means for longitudinally moving it, a tiller rope connected with said member, an elongated bearing for said member, and supporting plates adapted to be secured to any suitable fixed surface; said plates having offset wings rotatably inclosing said elongated member, whereby the reversal of said plates materially changes the level of said steering gear.

7. A steering gear comprising an elongated member, means for longitudinally moving it, a tiller rope connected with said member, an elongated bearing for said member having threaded ends, supporting plates having offset wings rotatably inclosing said threaded ends, nuts for said ends, washers between said nuts and wings, and means engaging said ends preventing relative turning of said washers and ends.

In testimony that I claim the foregoing invention, I have hereunto set my hand this 12th day of March, 1909.

WILLIAM E. GEYER.

Witnesses:
H. H. HILTON,
A. B. UPHAM.